United States Patent [19]
Pringle

[11] 3,876,821
[45] Apr. 8, 1975

[54] INJECTION MOLDED ELECTRICAL BOX
[75] Inventor: John Philip Pringle, Allen, Tex.
[73] Assignee: Capital Wire & Cable, Division of U.S. Industries, Plano, Tex.
[22] Filed: Nov. 20, 1972
[21] Appl. No.: 307,839

[52] U.S. Cl. .......................... 174/53; 85/36; 220/3.2
[51] Int. Cl. ............................................. H02g 3/08
[58] Field of Search ...................................... 174/53; 220/3.2–3.94; 85/32 V, 36

[56] References Cited
UNITED STATES PATENTS
2,149,719 3/1939 Arnest ................................. 220/3.4
3,353,701 11/1967 Palmer ................................. 220/3.5

Primary Examiner—J. V. Truhe
Assistant Examiner—D. A. Tone
Attorney, Agent, or Firm—Richards, Harris & Medlock

[57] ABSTRACT

A molded plastic electrical junction box is disclosed. The box is generally rectangular with an open front face for mounting a receptacle or switch. Molded recesses at various locations in the box walls define knockout panels which may be folded or broken away for running electrical conductors to the box interior. The exterior of the opposite end walls carry integrally molded lugs which define an angular passageway for receiving a fastener for securing the box to a stud or joist. Bosses on the end walls are adapted for quick fastening of a switch or receptacle bracket to the box with threaded fastener. In one embodiment, the bosses define self-tapping holes for receiving a screw. Alternate embodiments disclose fastening devices including a plastic or metal insert speed-type nut for securing the switch or receptacle bracket. Another embodiment of the fastener includes a deflectable thread-carrying arcuate member.

1 Claim, 20 Drawing Figures

PATENTED APR 8 1975

INJECTION MOLDED ELECTRICAL BOX

The present invention relates to an electrical wiring device such as an outlet or junction box, and more particularly relates to an injection molded electrical junction box of a nonmetallic or plastic material.

In dwelling and commercial construction it is well known to house switches, outlet receptacles and other electrical devices in junction boxes. The junction boxes receive the terminal ends of electrical conductors and the necessary electrical connections to the devices are made within the box. The electrical junction boxes are fastened in some manner to wall studs having the open face of the box approximately flush with the exterior wall surface. A cover plate at the wall opening encloses the open face of the box. Several fasteners extend through the cover plate into tapped holes appropriately provided on the switch or outlet receptacle bracket. The switch or outlet receptacle or other electrical device is secured to the box at receptacle mounting holes in the box which accept one or more machine screws supplied with the device.

It is known in the art to fabricate receptacle boxes of molded construction from a non-metallic material. It is also known to provide one or more nail receiving passageways molded in the material of the box extending from one side of the box to an opposite side. These nail receiving passageways are generally formed in the rear wall of the receptacle box at the juncture of the rear or bottom wall and end wall. There are several problems with this type of construction. Since the box occupies a substantial part of the distance between studs, in some installations very little room is available for insertion of the hammer to drive the nail in place. Further, since the nail is driven to a position abutting one side of the receptacle box, a misplaced blow can break or otherwise damage the receptacle box. The location of the passageway at the rear of the box makes access to the nail difficult in some constructions.

Mounting the bracket or strap of the switch, outlet receptacle or other device to the plastic juncture box has also been a problem. It is common to provide integrally molded ears on the box which define threaded bores that are adapted to receive screws for fastening the mounting straps. Provision for inclusion of the internal screw threads and lug complicates the molds or dies or requires a secondary tapping operation. Since the boxes are often located in positions of difficult access, the starting and turning down of a screw in the screws threads may require considerable time and effort on the part of the installer.

Another requirement for a junction box is that access be provided for conveniently bringing electrical cable or conductor into the box. Generally this is accomplished in the prior art by providing apertures in various locations in the box or by providing concealed knockouts adjacent the closed bottom of the box. The knockouts are generally produced by reducing the wall thickness in the area of the knockout. The thinned wall areas may be readily broken away by the use of a screwdriver or other tool when it is desired to run conduit into the box. The problem with this type of knockout is that the severing of the thin wall portion often leaves a sharp, jagged edge which is free to cut the sheathing on a conductor or cable. Further, the breaking away of a portion of the box wall leaves an unsightly opening and will result in pieces or particles of the box material being broken away to possibly cause interference with the operation of the contained electrical device.

Thus the above clearly outlines that a need exists for a molded electrical junction box which can be readily fabricated at low cost. The box should have provision for easy mounting on a wall member or stud or the like. The box should also have provision for running conduit or cable into the box from various locations around the box. The junction box should also provide quick and easy mounting of the switch or receptacle bracket.

The junction box of the present invention overcomes the problems found with prior art junction boxes and meets the requirements outlined above. The junction box of the present invention is designed to be injection molded from a non-metallic material such as a thermosetting plastic resin. The box is generally rectangular having an open front face with bosses oppositely provided at the open face. The bosses provided for quick, easy mounting of the switch plate or electrical device mounting bracket. In the preferred embodiment the bosses are self-tapping as the bracket mounting screw is turned in place. In other embodiments the bosses carry various speed fastener devices for rapid fastening of the bracket. Lugs defining nail passageways are provided on the exterior of the opposite end faces of the box. The nail lugs are formed to prevent the nail from being bent as it is hammered into a stud or other adjacent support. The nail passageways are disposed at an angle with respect to the face of the box as well as to the end of the box to make penetration of the nail into the mounting stud easier. The nail lugs are located at a central position on the end faces of the box to afford the installer more room and better access to the fastening nails. Since the nail passageways are not formed as a part of the main body of the box, the likelihood of damage to the box bearing installation of the nails is reduced.

The above and other objects and advantages will become more apparent from the following description and drawings in which.

Figure 2:
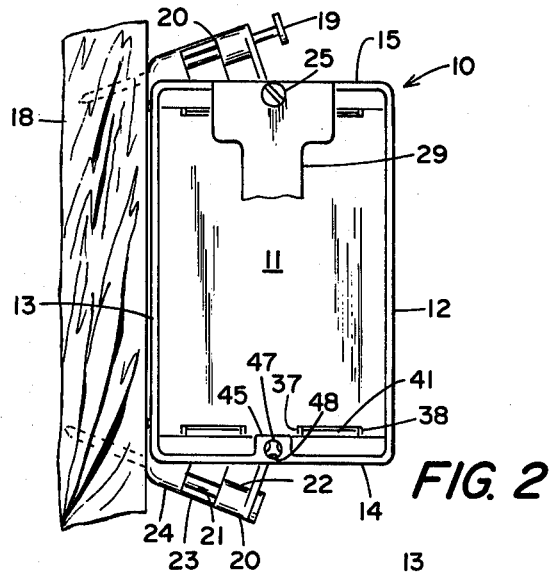
FIG. 2 is a front view of the installed box.

Turning now to the drawings, the preferred embodiment of the junction box of the present invention is shown in FIGS. 1 through 8 and is generally designated by the numeral 10. Box 10 has bottom wall 11 and opposite upstanding sidewalls 12 and 13. The box is completed by opposite end walls 14 and 15 forming a generally rectangular enclosure. End walls 14 and 15 are angled slightly outward from bottom 11 and are stepped having an intermediate shoulder 17. The front face of the box is open at 16 defined at the upper ends of the walls 12 to 15. The box is shown as being generally rectangular which is the preferred shape since it is designed to be cooperable with standard electrical switches, receptacles, and similar devices. Obviously the box may be of other suitable shapes.

As shown in FIG. 2, the box is side mounted on a stud or similar support 18 by common wire nails 19. The nails extend through nail passageways 21 in nail lugs 20 which are molded into the material of the box and extend from opposite end walls 14 and 15 at the location of shoulder 17. It will be seen that each of the nail receiving lugs 20 define a nail passageway 21 diverging at an angle in the order of 20° with respect to the associated end face 14 and 15. Additionally each nail receiving passageway 21 is also angular with respect to front face 16 of the box extending from the top toward the bottom wall. Lug 20 is formed by three connected ribs 22, 23 and 24, each of which are provided with grooves 26, 27 and 28, respectively, which cooperatively define the nail receiving passage 21. Outer rib 24 has its outer edge terminating at sidewall 13. Inner rib 22 is located adjacent the center line of the end walls so that the entire lug is located on one half of the associated end wall. The middle lug 23 is joined to the other two lugs but is, in effect, reversed having its groove disposed toward open face 16. By forming the nail receiving passageway 21 in the manner described using a series of connected grooved ribs, the junction box 10 may be fabricated in an injection molding process with a minimum of difficulty. The grooves 26, 27 and 28 may be formed by a proper die configuration without the requirement of any secondary drilling operations or inclusion of complicated die parts. In this way, the box can be molded in finished form at low cost. It will be obvious, of course, that nail passage 21 could similarly be formed by drilling a hole through a single lug disposed on each of the end walls. However, such fabrication requires addition or secondary operations which add to the cost of the box.

The opposite end walls 14 and 15 are each provided with two knockout panels 30, 31 and 32, 33 respectively, which are parallel to the end walls. The knockout panels are formed in the box during the molding process and may be located at any desired location on the box, for example as shown, in the end walls adjacent the bottom or additionally in the bottom wall or sidewalls. Each panel is positioned in a generally rectangular recess 34 formed in the box end wall. Each panel is connected at edge 35 to bottom 11 inward of the associated end wall. The upper edge of panels 30 to 33 are integrally joined to the associated box wall at tabs 37 and 38. Slots or openings 41 are defined around side and top of panels 30 to 33.

Thus it will be seen that the knockout panels of 30 to 33 can be fabricated as described above and may be molded integrally with the box. No secondary operations or intricate or laterally movable or retractable die parts are required. The recessed knockouts are clearly visible to the installer and are located to permit convenient access to all parts of the interior of the box. Removal of the knockouts is accomplished by insertion of a screwdriver or other tool into one of the slots 41, from either inside or outside of the box. The screwdriver is depressed causing the panels to breakaway at tabs 37 and 38 without being shattered. After the opposite tabs 37 and 38 have been severed from the associated box end walls, a flap is formed by the panel pivotally attached to the box at lower edge 35. The electrical connector or conduit is inserted through the opening defined between the edges of the panel 31 and the recess 34 in the box sidewall. While it may be possible to entirely breakaway the panels 30 to 33 during installation, it is desirable in most instances to leave the panel connected to the box at its edge 35 so that once the conductor is inserted into the box the flap formed by the panel member may be partially returned to its original position, thus shielding the interior of the box from plaster and other debris that may be loosened within the structure wall. Further since the material of the box is a plastic characteristically exhibiting a spring-like tendency, the panel flap will tend to return to its original position.

Figure 1:
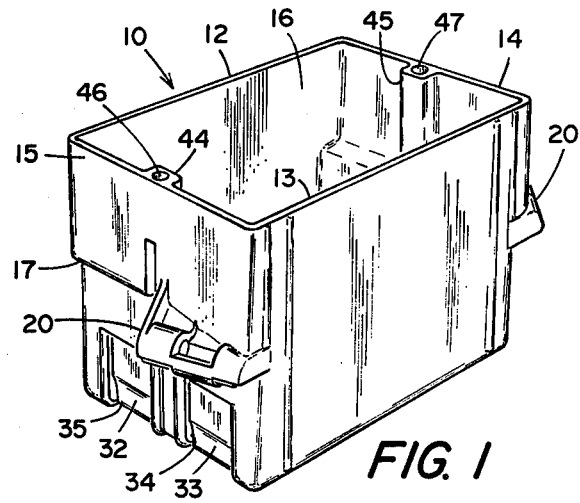
FIG. 1 is a perspective view of the junction box of the present invention.
Figure 3:
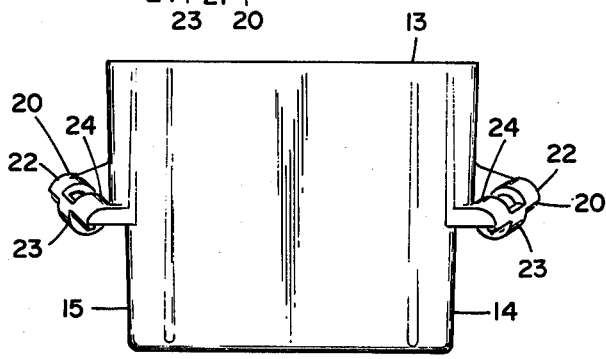
FIG. 3 is a side view of the box.
Figure 4:
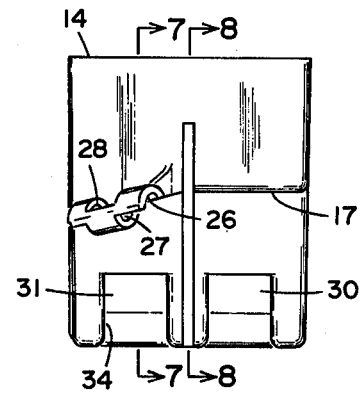
FIG. 4 is an end view of the box.
Figure 5:
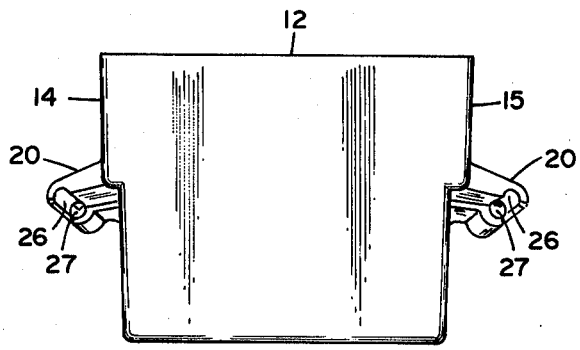
FIG. 5 is a view from the opposite side of the box as shown in FIG. 3.
Figure 6:
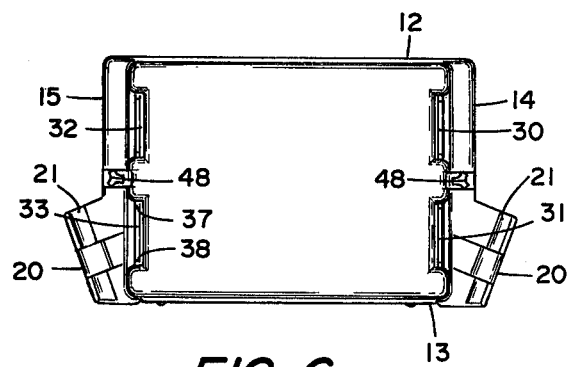
FIG. 6 is a bottom view of the junction box of the present invention.
Figure 7:
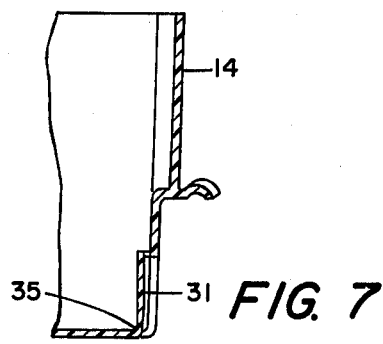
FIG. 7 is a sectional view taken along lines 7—7 of FIG. 4.
Figure 8:
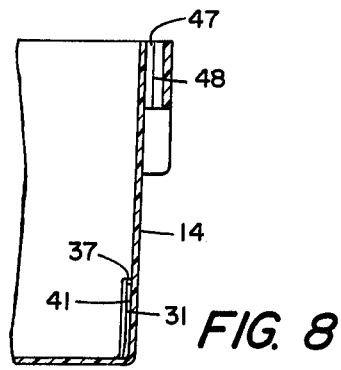
FIG. 8 is a sectional view taken along lines 8—8 of FIG. 4.

The interior side of opposite end walls 14 and 15 are provided with rectangular bosses 44 and 45 that extend along the end wall centerline and intersect the interior of shoulder 17. As seen in FIGS. 1 and 2, bosses 44 and 45 define passageways 46 and 47 at a location adapted to receive a screw 25 for mounting of bracket or strap 29 of a switch or other electrical device. Passageways 46 and 47 are not provided with internal threads but are formed having axially extending ribs 48. Thus as screw 25 is turned down into the passageways 46 and 47, ribs 48 will extrude between the threads tapping the screw threads as the machine screw is turned down. The self-tapping passageways 46 and 47 permit quick, easy connection of the switch bracket to the receptacle box. Since bracket 29 normally will not be removed once it is installed, repeatability of operation is not normally a requirement for the fastening of the switch bracket to the box.

Figure 9:
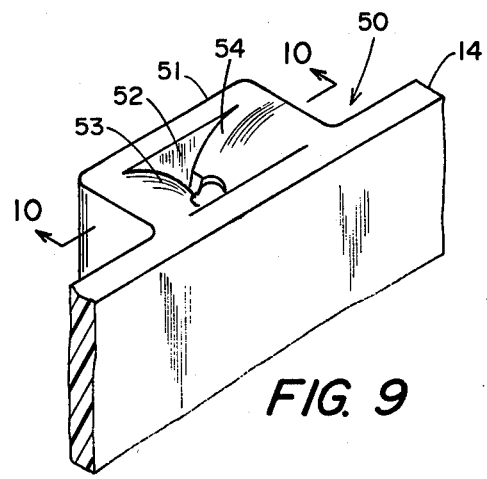
FIG. 9 is a fragmentary perspective view illustrating an alternate embodiment of fastener.
Figure 10:
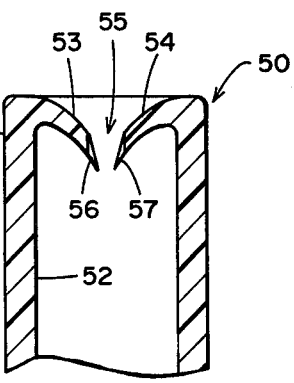
FIG. 10 is a sectional view taken along lines 10—10 of FIG. 9.

The molded plastic junction box of the present invention can also be provided with alternate forms of the quick fastener for the switch bracket. Referring to FIGS. 9 and 10, an alternate form of fastener for a switch or receptacle bracket is shown and is generally designated by the numeral 50. In this embodiment the opposite end walls 14 and 15, end 14 is illustrated, of junction box 10 have a boss 51 extending inwardly along the interior of the wall. Boss 51 is shown as being generally rectangular defining an interior fastener receiving passage 52. The top of fastener receiving passage 52 is partially enclosed by integrally formed speed fastening device 55 having leaves 53 and 54. Leaves 53 and 54 are inwardly bent from the opposite sides of passage 52 and terminate at semi-circular ends 56 and 57. It will be observed that the configuration of fastener 55 is similar to that of a conventional speed fastener. When a bracket is positioned across the face of the junction box 10, the accompanying screw is inserted into fastener receiving channel 52 and turned a few quick turns. The fastener tends to separate the leaves 53 and 54 and is guided in semi-circular openings 56 and 57 at the end of the leaves. The tendency of the fastener to become dislodged is resisted by leaves 53 and 54. It will be apparent that this form of fastener can be integrally formed when the box is molded of the material of the box.

Figure 11:
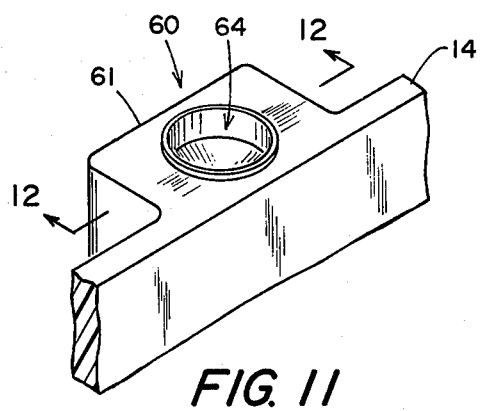
FIG. 11 is a fragmentary perspective view showing another alternate embodiment of the fastener.
Figure 12:
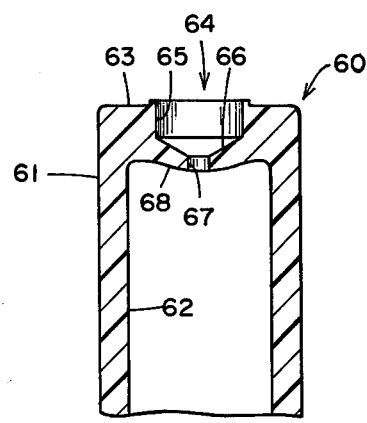
FIG. 12 is a sectional view taken along lines 12—12 of FIG. 11.

FIGS. 11 and 12 show another embodiment using a self-tapping fastener for a switch bracket. In this embodiment generally designated by the numeral 60, the interior of the end walls 14 and 15 of the junction box 10 are oppositely provided with a generally rectangular boss 61 extending on the interior side of the end walls 14 and 15. Boss 61 defines a hollow fastener receiving passageway 62 which is partially enclosed by top portion 63. A recess 64 is formed in top portion 63. Recess 64 includes a circular portion 65 and a frusto-conical member 66 terminating at centrally located bore 67 in the bottom of recess 64. A screw or similar fastener accompanying the switch plate bracket is inserted into recess 64 and is guided by the conical bottom into bore 67. The installer simply turns the fastener a few quick turns which will cause the fastener to penetrate through the bottom portion 68 at bore 67 tapping threads as the fastener advances. It will be appreciated that this embodiment of the fastener structure requires no significant alteration in the box structure and can be easily incorporated into the mold design when the box is fabricated.

Figures 13, 14, 15:
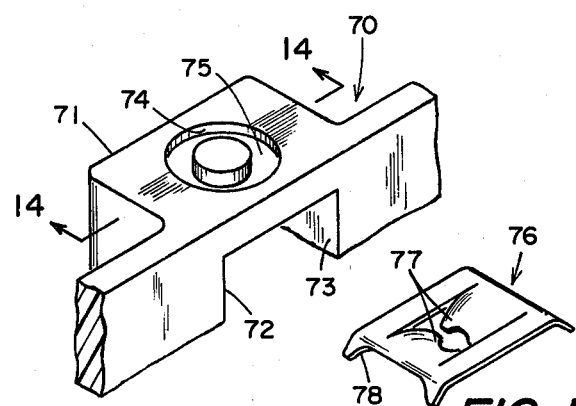
FIGS. 13 to 15 illustrate still another embodiment of the fastener associated with the box for mounting a receptacle bracket.

FIGS. 13, 14 and 15 show still another form of the fastener structure associated with the junction box 10. This embodiment is generally designated by the numeral 70 and includes boss member 71 extending on the interior side of walls 14 and 15. Boss 71 defines a generally rectangular recess 72. Recess 72 is accessible from the exterior of sides 14 and 15 at opening 73. Annular recess 74 is provided at the top of the boss 71 having a relatively thin rupturable bottom 75. The rupturable bottom functionally serves to prevent plaster and debris from entering the box at this location. As seen in FIG. 15, the threaded fastener is held in place by means of rectangular speed-type insert 76 which is preferably metal and is pressed into place in the upper end of passageway 73. Ears 78 extending from the edges of insert 75 engage the opposite sidewalls of passageway 72 to secure the insert in place as seen in FIG. 15. When the fastener is advanced in recess 74, bottom wall 75 will be ruptured and the screw threads will be engaged by opposite leaves 77 to secure the fastener and bracket. The advantage of the metal insert 75 as compared with the plastic nut of embodiment 60 is that the insert will withstand repeated use cycles. The inclusion of the metal insert requires the additional operation of inserting the part in its proper place in passageway 72.

Figure 16:
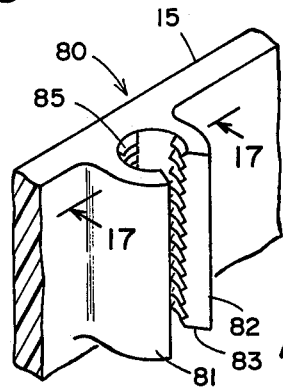
FIGS. 16 and 17 illustrate another embodiment of the fastener.
Figure 17:
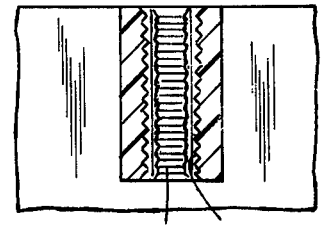

Still another form of the fastener device is illustrated in FIGS. 16 and 17 and is generally designated by the numeral 80. The embodiment 80 includes arcuate members 81 and 82 oppositely extending along the interior walls 14 and 15 of junction box 10. A partial detail of wall 15 is shown. Arcuate walls 81 and 82 are separated by axially extending opening 83. Projections 81 and 82 along with end wall 14 define a generally circular passageway 85. Extending axially along sides of passageway 85 are a plurality of serrations or teeth 86. Teeth 86 are formed having generally V-threads 87 adapted to engage the screw fastener as it advances into the fastener. The length of sections 81 and 82 and the accompanying threads substantially coincide to full depth engagement with any fastener that may be secured to the assembly. It will be observed that when a screw is advanced into the screw receiving channel, members 81 and 82 will be caused to be deflected outwardly having a spring-like tendency to return to their normal unstressed condition. The spring-like force acting against the periphery of the screw fastener along with the associated axially extending teeth 86 will result in the screw being securely held in place within the fastener member 80.

Figure 18:
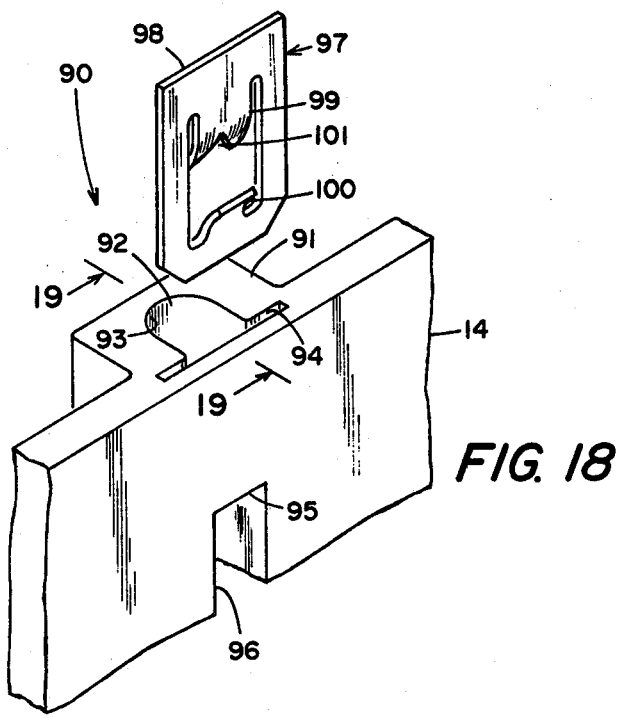
FIGS. 18 to 20 show still another embodiment of fastener.
Figure 19:
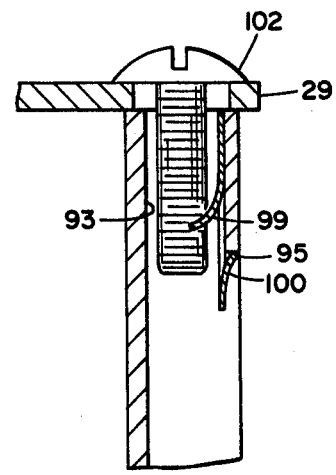
Figure 20:
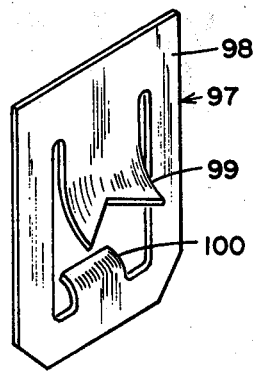

FIGS. 18 to 20 show still another embodiment of the present invention generally designated by the numeral 90. Boss 91 extends downwardly along the interior of opposite end walls 14 and 15. A partial detail of wall 14 is shown as being typical. Channel 92 extends in boss 91 having semi-circular interior edge 93. A transverse slot 94 extends parallel to end wall 14 and intercepts channel 92. A vertical slot 96 extends partway in the end wall and intercepts channel 92. Slot 96 terminates at shoulder 95.

Speed type insert 97, best shown in FIGS. 18 and 20, is formed having a generally rectangular body 98 with oppositely bent tabs 99 and 100. Tab 99 is notched at 101. As seen in FIGS. 18 and 19, insert 97 is snugly received in slot 94 and when formed downwardly assumes a position with tab 100 engaging shoulder 95 to secure the insert in place. Tab 99 projects into channel 92 with notch 101 centrally aligned with bracket 29 in place against the face of the box, and threaded fastener 102 can simply be pushed into position in channel 93 with the threads engaging tab 99. Removal of fastener 102 is resisted by insert 97 at shoulder 95. With this type of insert, fastener 102 can be turned in place, or more efficiently, can be simply pushed or "zipped" into position causing tab 99 to slightly deflect to accept the fastener. It will be obvious that insert 97 could be integrally formed.

Thus from the foregoing it will be seen that an electrical junction box is disclosed having a number of advantages not found in the prior art. Although a preferred alternate embodiment of the invention is disclosed, it will be obvious to those skilled in the art to make changes, alterations and modifications within the scope of the invention as claimed.

What is claimed is:
1. An electrical junction box comprising:
a unitary molded plastic enclosure having a bottom and upstanding opposite side and end walls defining an open face at their upper ends; and
boss means on said box at opposite walls for mounting a bracket to said box, said boss means housing quick fastener means for reception of a threaded fastener,
said boss means including a passageway and internal abutment means at said passageway and said quick fastener means comprising insert means in said passageway including means engaging said internal abutment means and means for engaging a threaded fastener,
said passageway including a slot generally parallel to an enclosure wall and said insert means comprising a relatively thin metal clip receivable in said slot having oppositely bent tabs, one of said tabs adapted to engage a threaded fastener.

* * * * *

Notice of Adverse Decision in Interference

In Interference No. 99,485, involving Patent No. 3,876,821, J. P. Pringle, INJECTION MOLDED ELECTRICAL BOX, final judgment adverse to the patentee was rendered May 19, 1977, as to claim 1.

[*Official Gazette September 20, 1977.*]